March 12, 1957  K. A. BROWNE  2,785,020
JOURNAL BEARING

Filed Oct. 8, 1954  2 Sheets-Sheet 1

INVENTOR.
KENNETH A. BROWNE
BY
Bosworth Sessions Herretren
& Williams
ATTORNEYS

March 12, 1957 K. A. BROWNE 2,785,020
JOURNAL BEARING
Filed Oct. 8, 1954 2 Sheets-Sheet 2
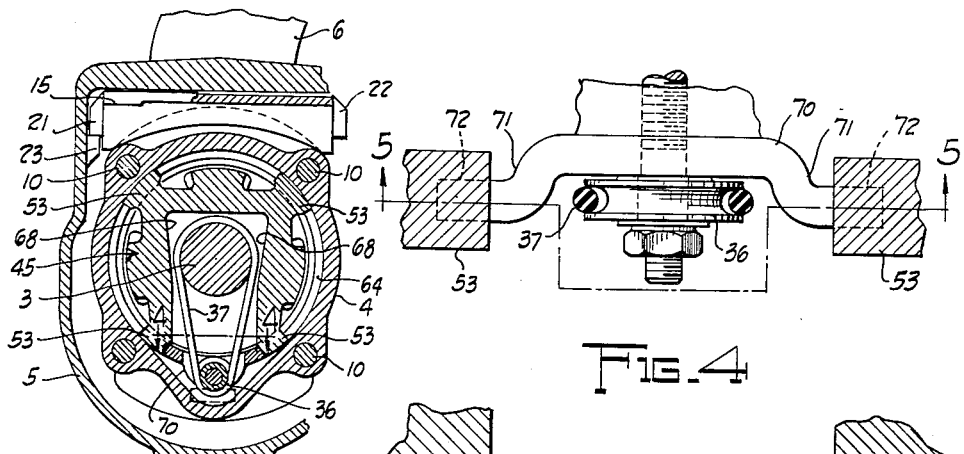
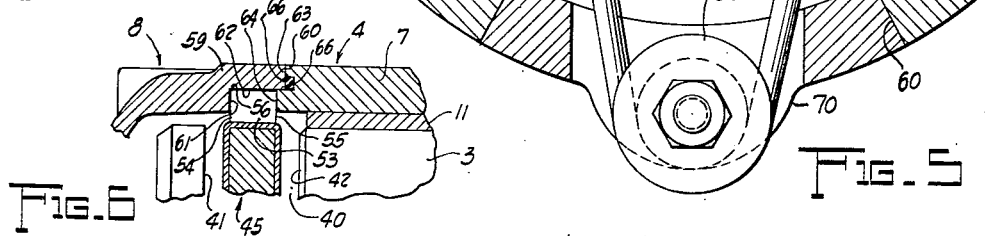
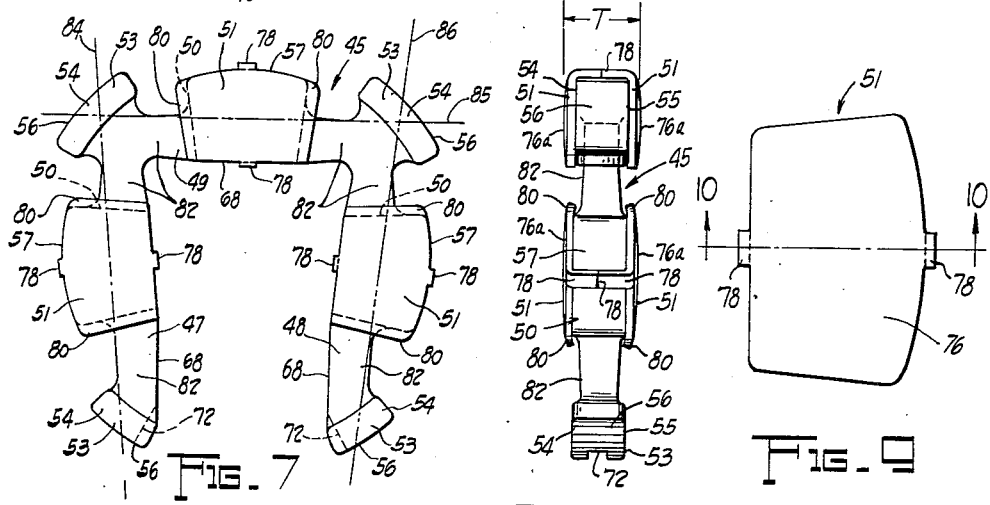
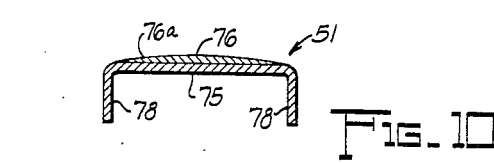
INVENTOR.
KENNETH A. BROWNE
BY Bosworth, Sessions,
Herström & Williams
ATTORNEYS

United States Patent Office 2,785,020
Patented Mar. 12, 1957

2,785,020

JOURNAL BEARING

Kenneth A. Browne, Lakewood, Ohio, assignor to The Chesapeake and Ohio Railway Company, Cleveland, Ohio, a corporation of Virginia Application October 8, 1954, Serial No. 461,274

5 Claims. (Cl. 308—41)

This invention relates to journal bearings and in particular to axle journal bearings for railway cars and the like.

Proper lubrication of an axle journal requires that adequate quantities of lubricant be distributed over the end flange or thrust bearing surface as well as the cylindrical surface of the journal proper. In the past, oil for the thrust bearing has been derived from axial flow of the oil film between the bearing and the central parts of the journal surfaces. This film is inadequate to provide a sufficient quantity of oil for proper lubrication of the thrust bearing. Moreover, the vertical load distribution on the journal normally is such that bearing pressure is maximum at the central parts of the journal and is minimum at the ends. The pressure of the oil film diminishes correspondingly toward the ends of the journal and oil tends to drop off the journal before reaching the thrust bearing. This results in insufficient lubrication of the thrust bearing and undue wear of the bearing surface.

A general object of my invention is to provide positive lubrication of an axle thrust bearing, thereby minimizing wear and prolonging the life of the bearing. Another object is the provision of means for lubricating an axle thrust bearing independently of the axle journal to insure distribution of adequate quantities of oil to all axle thrust bearing surfaces. A more specific object is the provision of a sealed axle journal bearing with a separate thrust bearing plate disposed in an oversized groove in the journal and supported on a bearing housing surrounding the journal to resist thrust loads, and means for positively lubricating the bearing engaging surfaces of the groove. A further object is the provision of a journal bearing construction with a load distributing wedge which centers the vertical load transmitted by the journal box on the journal.

Other objects are the provision of a removable thrust plate supported on a housing sealed on the journal and constructed so that normal thrust loads are always perpendicular to the bearing surfaces on the plate; the provision of a thrust bearing with crowned bearing surfaces which automatically admit greater quantities of lubricant to the surfaces as the thrust load increases; the provision of a sealed journal bearing assembly with a separate thrust bearing plate which quickly and easily may be removed from the assembly for inspection and maintenance; and the provision of a thrust bearing having removable bearing elements which permit economical maintenance of the bearing.

The means of accomplishment of these and other objects of my invention will become apparent from the following description of a preferred embodiment thereof reference being had to the accompanying drawings.

Figure 3 is a transverse section through the thrust bearing and taken on the line 3—3 of Figure 1.

Figure 4 is an enlarged horizontal section taken on the line 4—4 of Figure 3 and showing the thrust bearing retainer wedge.

Figure 5 is a vertical section taken on the line 5—5 of Figure 4.

Figure 6 is an enlarged fragment vertical section of the outer end of the bearing assembly showing connection of the cover to the body of the bearing housing.

Figure 7 is an elevation of the thrust bearing embodying my invention.

Figure 8 is an end view of the bearing shown in Figure 7.

Figure 9 is an elevation of a bearing element constituting part of the thrust bearing of Figures 7 and 8.

Figure 10 is a section through the bearing element taken on the line 10—10 of Figure 9.

Figure 1:
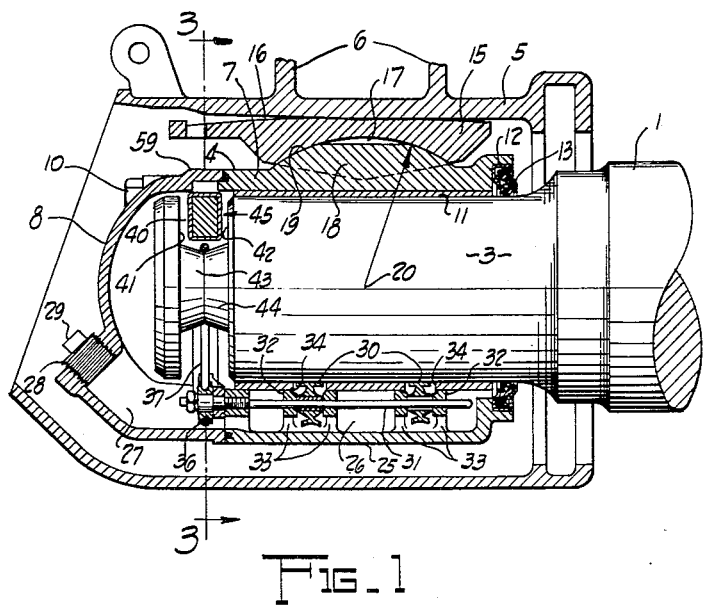
Figure 1 is a longitudinal section through the journal box and bearing assembly embodying my invention.

Referrring now to the drawings, reference character 1 indicates one end portion of a conventional railway car axle on which a railway wheel, not shown, is mounted. At each end of the axle is a journal, one being shown at 3 in Figures 1 and 2, removably mounted in a bearing housing 4 which is disposed within a journal box 5. The truck side frame, a portion of which frame is indicated at 6, connects to the top of the journal box 5 and transmits the weight of the railway car through the journal box and bearing housing to the journal.

The bearing housing 4 completely encloses a substantial portion of the journal and comprises a substantially cylindrical open ended shell or casing 7 and cover 8 removably fastened to the outer end of the shell by bolts 10. A sleeve bearing 11 lined with or composed of bearing metal and press fitted into the shell 7 fits closely on the journal. The inner end of shell 7 is recessed at 12 to receive a continuous annular seal 13 which engages the journal and prevents axial leakage of lubricant from the bearing housing.

Figure 2:
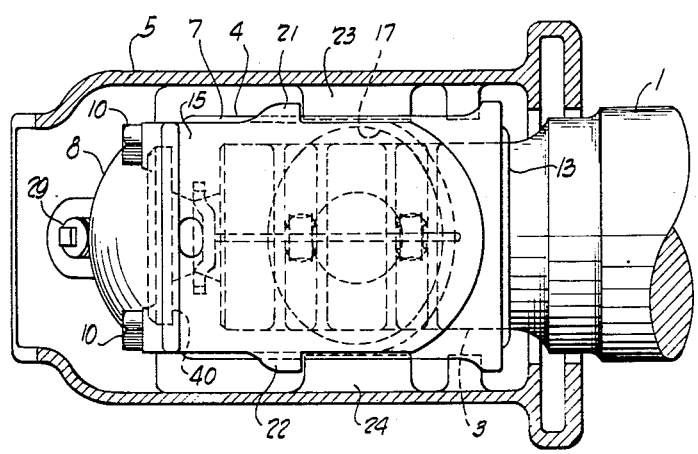
Figure 2 is a plan view of the bearing assembly and journal box, the top of the journal box having been cut away to show details of construction.

The weight of the car is transmitted to journal 3 through a wedge 15 located between the undersurface of the top of the journal box 5 and the top of the bearing housing 4. The upper surface 16 of wedge 15 is convex to permit relative rocking movement between the journal box and wedge. The under surface of wedge 15 has a concave spherically shaped recess 17 which seats on a boss 18 formed with a mating spherical surface 19 formed on top of the bearing housing. I prefer that the spherical wedge and boss surfaces have radii of equal length and, when engaged as shown in Figure 1, have coincident centers 20 which lie on the axis of the axle 1 substantially centrally of the journal. Thus the resultant of the car load on each journal bearing is directed substantially through the center of the bearing, even when the car rocks laterally relative to the journal box, and the thrust component of this resultant of the load acts along the journal axis perpendicular to the thrust bearing and uniform thrust load distribution on the thrust bearing is assured. Also, since the thickness of the journal lubricating oil film is maximum at central part of the journal and a minimum at the ends, centering of the load on the journal prevents undue wear of the journal at its ends. Wing type lugs 21, 22, see Figure 2, projecting from the sides of wedge 15 are adapted to engage inwardly projecting bosses 23, 24 on the journal box to prevent axial shifting of the wedge and bearing housing relative to the journal box.

The bottom of the bearing housing is spaced from the lower part of the journal box when the parts are assembled for operation as shown in Figure 1 in order to facilitate removal of the bearing housing from the journal box. When the parts are disassembled, the journal box is lifted up from the axle and the bearing housing and wedge 15 are removed therefrom.

The bottom wall 25 of bearing housing 4 is spaced below sleeve bearing 11 to provide a reservoir 26 for lubricating oil. The outer end of the reservoir joins a channel 27 in the lower part of cover 8 having a port 28 and a removable plug 29 accessible to maintenance men for replenishing oil in the reservoir. Oil from the reservoir 26 is distributed to the cylindrical journal surfaces by rollers 30 journalled on a shaft 31 which is supported in longitudinally spaced bosses 32 formed on the bottom wall of the bearing housing. Apertures 33 in the lower parts of bosses 32 permit flow of the lubricant throughout the entire length of the reservoir. As the axle turns when the car is in motion, rollers 30, with their peripheries engaging the journal, rotate in the oil in the reservoir and carry the oil to the journal. Bearing sleeve 11 is suitably apertured as indicated at 34 to permit rollers 30 to engage the journal. The outer end of shaft 31 carries a pulley 36, see Figures 3, 4 and 5, which is immersed in the oil and around which a belt or band 37 passes for lubricating the thrust bearing described in detail below.

In order to limit axial movement of the axle relative to the bearing housing, an annular groove 40 is formed in the journal near its outer end, see Figure 1. The groove 40 is defined by plane side surfaces 41, 42 which are perpendicular to the journal axis, and a bottom wall having conical surfaces 43, 44 diverging outwardly from the center to the sides 41, 42 respectively, of the groove. Belt 37 is aligned with the center of groove 40 and engages bottom surfaces 43, 44 of the groove. A thrust bearing or plate 45 is supported between the outer end of the housing shell 7 and cover 8 and extends within the groove 40 and engages the sides of groove to limit axial movement of the axle.

Thrust bearing 45, see Figures 1, 3, 7 and 8 comprises a one piece generally U-shaped plate preferably of forged steel, having side legs 47, 48 spaced apart at one end and connected at the other end by cross leg 49. Each of the legs has an enlarged portion 50, constituting a bearing pad, located centrally thereon and to which bearing elements 51, see Figures 9 and 10, are secured. Projecting outwardly from the four corners of the U-shaped plate 45 are retainer pads 53 having flat side surfaces 54, 55 and curved peripheral surfaces 56; the curvature of surfaces 56 having equal radii and a common center located centrally between the legs of the plate 45. It will be noted the peripheral surfaces 57 of bearing pads 50 are spaced inwardly from retainer pads 53 and are substantially axially aligned with the cylindrical surface of journal 3.

In order to support thrust bearing 45 in alignment with groove 40 in the journal, the rim 59 of bearing housing cover 8 is formed with an internal annular recess having a shoulder 61 and a cylindrical surface 62, see Figures 1 and 6, and the outer end of housing shell 7 has an external annular shoulder 63. Retainer pads 53 of plate 46 fit snugly within recess of the cover with the peripheral pad surfaces 56 concentric with the cylindrical recess surface 62 and the outer pad side surfaces 54 in abutment with shoulder 61. When the cover is tightened on the outer end of housing shell 7, the opposite side surfaces 55 of the retainer pads are pressed against the end surface 64 of the shell to firmly support the plate on the bearing housing, and lie in transverse planes between the side surfaces 41 and 42 of the groove. The inner end 60 of cover rim 59 seats tightly against the external shoulder 63 of shell 7 and the joint is sealed against leakage of oil by gasket 66.

Thrust bearing 45, when supported in the assembled bearing housing, extends into and around the upper part of journal groove 40 with the inner surfaces 68 of thrust plate legs 47, 48 and 49 spaced outwardly from lubrication belt 37 which passes around the bottom of the groove.

In order to lock the thrust bearing against rotation about the journal axis when the axle turns, a bearing wedge 70, see Figures 3, 4 and 5, is mounted on the forward portion of shaft 31 and has upwardly extending arms 71 which engage in recesses 72 in the inner corners of the lower bearing retainer pads 53. Wedge 70 is offset inwardly from pulley 36 and wedge arms 71 are bent forwardly and upwardly as shown to permit engagement with the thrust bearing without interference with pulley 36 and belt 37.

The bearing elements 51, see Figures 9 and 10, are substantially identical and each comprises a rigid preferably steel backing strip 75 and a liner 76 of bearing metal bonded thereto providing bearing surfaces for the thrust bearing. Bearing surface 76a preferably is crowned as shown in Figures 8 and 10 for proper distribution of lubricant to the load areas. A pair of bearing elements 51 is mounted on each bearing pad 50 with the bearing liners 76 facing away from the pad. The elements are secured on the pad by central, bent-over tabs 78 on the backing strips which extend along the inner and outer pad surfaces. The adjacent edges of the tabs on opposite bearing elements abut when the elements are properly positioned on the pad and the abutting edges are welded together as indicated at 78 in Figure 8.

Each bearing element 51 preferably is longer than the corresponding dimension of bearing pad so as to overhang each end of the bearing pad as indicated at 80 in Figures 7 and 8. As the thrust load on the bearing 45 shifts toward the ends of the bearing pads, the unsupported or overhanging ends 80 of the bearing elements bend inwardly forming a wedge shaped spacing between the engaging surfaces into which lubricating oil is drawn. Thus adequate lubrication of the bearing surfaces at the point of maximum loading is provided.

Since the thrust bearing 45 is supported at its outer extremities on retainer pads 53, the bearing pads 50 tend to yield and move axially a slight amount relative to the retainer pads under thrust loads. In order to permit yielding of the bearing pads under load without twisting, the portions of the thrust plate legs 47, 48 and 49 interconnecting adjacent bearing pads and retainer pads are necked down or tapered as at 82 to make these portions resilient without, however, materially detracting from the strength of the bearing structure.

It will be noted that the centers of retainer pads 53 and bearing pad 50 in each leg of bearing plate 45 are aligned in straight lines, as indicated by the broken lines 84, 85 and 86 in Figure 7, with each bearing pad spaced equally from adjacent retainer pads. The thrust bearing is thus firmly supported at four corners while providing three spaced bearing areas of ample size with which to absorb thrust loads.

The thickness of the thrust bearing 45, that is, the axial spacing T, see Figure 8, of opposite bear surfaces of the bearing elements 51, is less than the corresponding width of journal groove 40 so that both sides of the thrust bearing are never engaged with the walls of the groove at the same time; opposite sides of the thrust bearing are engaged alternately during limited shifting of the axle relative to the bearing housing. The thrust bearing is lubricated by oil carried by belt 37 from the oil reservoir 26 to the conical surfaces 43, 44 which form the bottom of the journal groove. The belt, under slight tension, remains centered in the groove during rotation of the axle and the oil passes from the belt to surfaces 43, 44 and in substantially equal quantities to the sides 41, 42 of the grooves, spreading over and covering the sides with a relatively thick oil film by reason of centrifugal force. The thrust bearing engages the fully lubricated sides of the groove when the axle shifts and wear of the bearing is therefore kept to a minimum.

The above described journal bearing construction readily may be disassembled and assembled for purposes of inspection and repair. After the axle and bearing housing are removed from the journal box, cover bolts 10 are removed and the casing 7 of the journal bearing housing is removed axially along the journal away from the cover 8 until the cover and casing are separated. Thereafter, the cover is removed from the thrust bearing 45 and the latter lifted transversely of the journal out of engagement with the lower wedge 70 and out of the journal groove 40. Casing 7 then may be removed from the journal and the unit is disassembled.

Changes and modifications and improvements to the above described embodiment of my invention may be made by those skilled in the art without departing from the spirit and scope of the invention. Therefore I do not wish the patent to be limited in any manner inconsistent with the invention as defined in the appended claims.

I claim:

1. A removable thrust bearing for axle journals comprising a generally U-shaped plane plate having two side legs spaced apart at one end and connected at the other end by a cross piece with retainer pads located at the free end of each of the side legs and at each of the intersections of the side legs with the cross piece, and bearing pads intermediate the retainer pads, said retainer pads having arcuate peripheral surfaces with equal radii of curvature and a common center, said bearing pads having peripheral surfaces spaced from said center a distance less than radius of said retainer pad surfaces.

2. The thrust bearing according to claim 1 in which portions of said plate which connect the bearing pads with adjacent retainer pads have a reduced cross-sectional area and thus have limited resilience whereby the bearing pads can move transversely of the plane of the plate relative to the retainer pads.

3. The thrust bearing according to claim 1 with bearing elements secured to opposite sides of each of said bearing pads, said elements being longer than the respective bearing pads whereby the ends of the elements overhang the corresponding ends of the bearing pads.

4. In a bearing assembly, the combination of an axle having a journal, said journal having a cylindrical surface and an annular groove spaced inwardly from the outer end of the journal, a bearing housing substantially enclosing said journal, and comprising an open ended casing and a cover detachably connected to the outer end of the casing, the outer end of the casing being substantially radially aligned with the groove in said journal, bearing means between said housing and the portion of said cylindrical journal surface extending inwardly of said groove, and a thrust bearing having two side legs spaced apart at one end and connected at the other end by a cross piece with retainer pads located at the free end of each of the side legs and at each of the intersections of the side legs with the cross piece, and bearing pads intermediate the retainer pads, supported between said cover and the outer end of said casing with said bearing pads disposed in said groove, said groove being wider than the thickness of said bearing pads.

5. In a bearing assembly, the combination of an axle having a journal, said journal having a cylindrical surface and an annular groove spaced inwardly from the outer end of the journal, a bearing housing substantially enclosing said journal and comprising an open ended casing and a cover detachably connected to the outer end of the casing, said cover having an annular internal recess adjacent the end thereof connected to the casing, the outer end of the casing being substantially radially aligned with the groove in said journal, a sleeve bearing between said housing and the portion of said cylindrical journal surface extending inwardly of said groove, and a thrust bearing comprising two side legs spaced apart at one end and connected at the other end by a cross piece with retainer pads located at the free end of each of the side legs and at each of the intersections of the side legs with the cross piece, and bearing pads intermediate the retainer pads, said retainer pads being disposed in the recess in said cover and being pressed against the outer end of said casing when the cover is connected to the casing, said bearing extending into the journal groove.

References Cited in the file of this patent

UNITED STATES PATENTS

| | | |
|---|---|---|
| 397,901 | Dunbar | Feb. 19, 1889 |
| 628,480 | Lawson | July 11, 1899 |
| 1,020,423 | Hewitt | Mar. 19, 1912 |
| 1,421,661 | Bogdanoft | July 4, 1922 |
| 1,943,054 | Brittain | Jan. 9, 1934 |
| 2,176,244 | Brittain | Oct. 17, 1939 |